United States Patent
Long et al.

(10) Patent No.: US 9,323,541 B2
(45) Date of Patent: Apr. 26, 2016

(54) METHOD, APPARATUS, SYSTEM, AND MACHINE READABLE STORAGE MEDIUM FOR PROVIDING SOFTWARE SECURITY

(71) Applicant: Intel Corporation, Santa Clara, CA (US)

(72) Inventors: Qin Long, Shanghai (CN); Ting Ye, Shanghai (CN); Vincent Zimmer, Federal Way, WA (US); Jiewen Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 102 days.

(21) Appl. No.: 13/976,504

(22) PCT Filed: Feb. 25, 2013

(86) PCT No.: PCT/CN2013/071810
§ 371 (c)(1),
(2) Date: Jun. 27, 2013

(87) PCT Pub. No.: WO2014/127536
PCT Pub. Date: Aug. 28, 2014

(65) Prior Publication Data
US 2014/0250293 A1    Sep. 4, 2014

(51) Int. Cl.
*G06F 9/00*     (2006.01)
*G06F 9/44*     (2006.01)
*G06F 9/445*    (2006.01)
*G06F 21/51*    (2013.01)
*G06F 21/57*    (2013.01)

(52) U.S. Cl.
CPC .............. *G06F 9/4401* (2013.01); *G06F 9/445* (2013.01); *G06F 21/51* (2013.01); *G06F 21/575* (2013.01)

(58) Field of Classification Search
CPC ............ G06F 9/44502; G06F 9/44514; G06F 9/44523; G06F 11/1417; G06F 9/44505
See application file for complete search history.

(56) References Cited

U.S. PATENT DOCUMENTS

| | | | |
|---|---|---|---|
| 7,100,087 | B2 * | 8/2006 | Yang et al. ...................... 714/36 |
| 7,234,047 | B1 * | 6/2007 | Mahmoud ......................... 713/1 |
| 2003/0014673 | A1 | 1/2003 | Baum et al. |
| 2007/0033387 | A1 * | 2/2007 | Arnez et al. ....................... 713/1 |
| 2010/0017659 | A1 * | 1/2010 | Dos Remedios ................ 714/36 |
| 2010/0031276 | A1 | 2/2010 | Hseih |
| 2010/0325622 | A1 * | 12/2010 | Morton ......................... 717/168 |
| 2011/0131447 | A1 * | 6/2011 | Prakash et al. .................. 714/19 |
| 2013/0036298 | A1 * | 2/2013 | De Atley et al. .................. 713/1 |
| 2014/0331037 | A1 * | 11/2014 | Lewis .............................. 713/2 |

FOREIGN PATENT DOCUMENTS

CN    102200917    9/2011

OTHER PUBLICATIONS

PCT International Search Report and Written Opinion received for PCT Patent Application No. PCT/CN2013/071810, mailed on Dec. 5, 2013, 7 pages.

* cited by examiner

*Primary Examiner* — Zahid Choudhury
(74) *Attorney, Agent, or Firm* — Patent Capital Group

(57) ABSTRACT

Technologies are provided in example embodiments for determining that a module is to be loaded, the module being associated with module code, determining that the module is a frozen module, the frozen module being associated with frozen module code, determining that a module fingerprint of the module fails to correspond with a frozen module fingerprint of the frozen module, and causing loading of the frozen module code instead of the module code.

22 Claims, 11 Drawing Sheets

METHOD, APPARATUS, SYSTEM, AND MACHINE READABLE STORAGE MEDIUM FOR PROVIDING SOFTWARE SECURITY

TECHNICAL FIELD

This disclosure relates in general to the field of software security and, more particularly, to frozen modules.

BACKGROUND

The field of software security has become increasingly important in today's society. The Internet has enabled interconnection of different apparatuses over computer networks all over the world. However, the Internet has also presented many opportunities for malicious actors to exploit these networks to negatively impact an apparatus. Certain types of malicious software can be configured to infiltrate software modules of a system. Such software can perform any number of malicious actions, such as sending out spam or malicious emails from the apparatus, stealing sensitive information from a business or individual associated with the apparatus, propagating to other apparatuses, and/or the like. In addition, the malicious actor can sell or otherwise give access to other malicious actors, thereby escalating the exploitation of the apparatus. In other circumstances, a user may accidentally cause modification of a module in a way that is detrimental to the apparatus. Thus, the ability to effectively protect and maintain stable apparatuses and systems continues to present significant challenges for component manufacturers, system designers, and network operators. It may be desirable to be able to recover from circumstances where a detrimental change has been made to the software of an apparatus.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Example Embodiments

Figure 1:
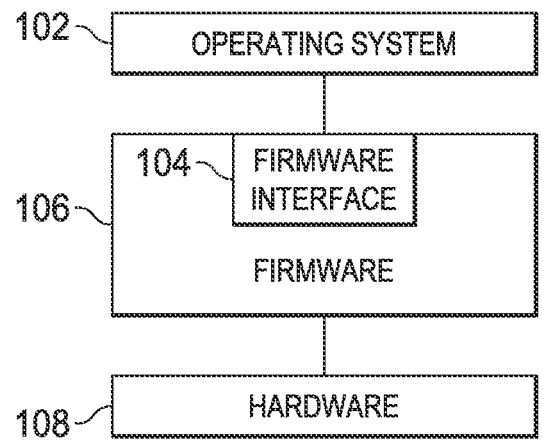
FIG. 1 is a simplified block diagram illustrating layers associated with firmware according to at least one example embodiment.

FIG. 1 is a simplified block diagram illustrating layers associated with firmware according to at least one example embodiment. The example of FIG. 1 is merely an example of layers associated with firmware, and does not limit the scope of the claims. For example, operations attributed to a layer may vary, number of layers may vary, composition of a layer may vary, and/or the like. For example, in some example embodiments, operations attributable to one layer of the example of FIG. 1 may be allocated to one or more other layers.

Figure 11:
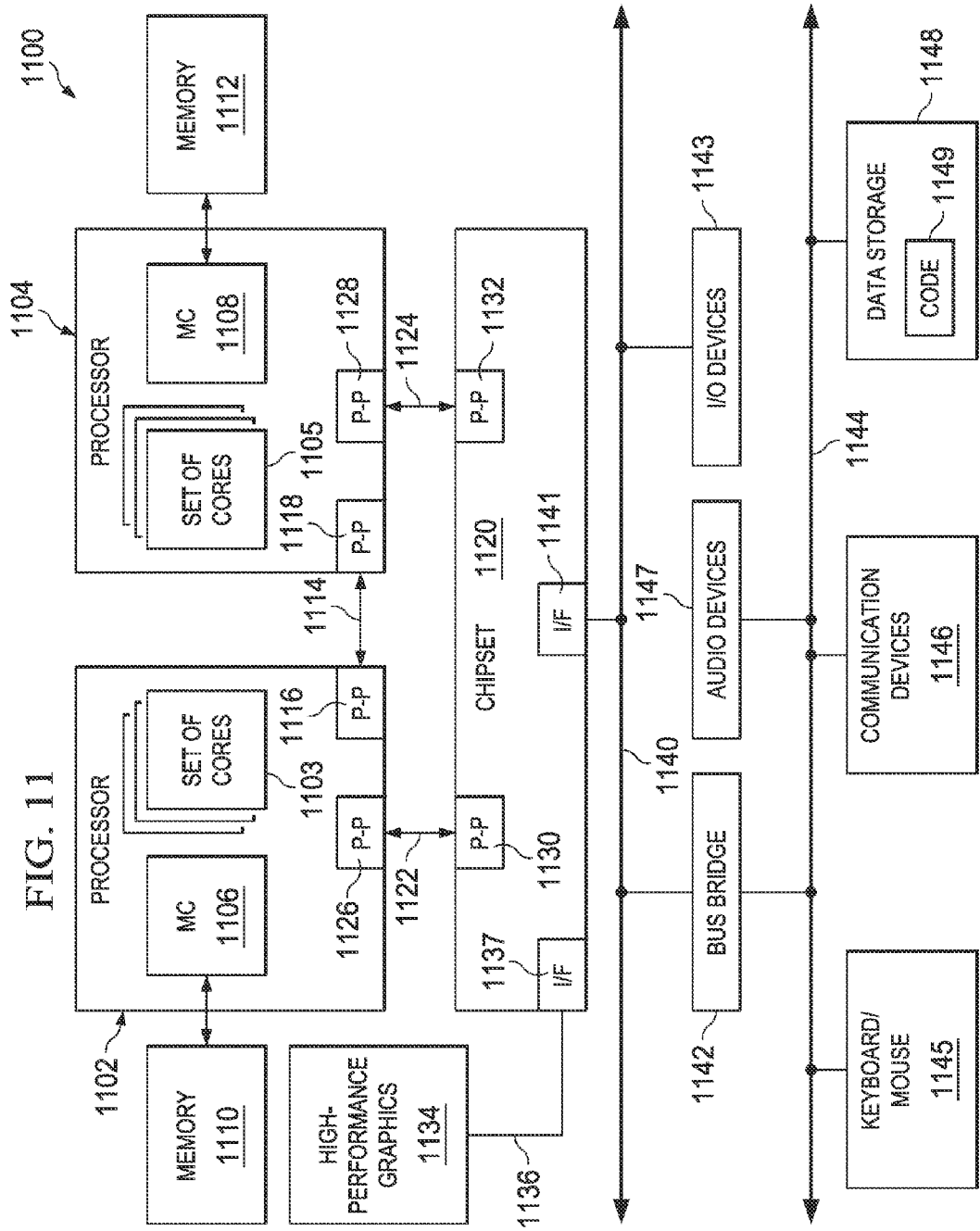
FIG. 11 is a block diagram showing a computing system that is arranged in a point-to-point (PtP) configuration according to an embodiment.

FIG. 1 illustrates a simplified example of layers that may be present in a computing system, such as computing system 1100 of FIG. 11. FIG. 1 illustrates firmware 106 in communication with hardware 108 and operating system 102. For the purposes of this document, firmware interface 104 is comprised by firmware 106. In at least one example embodiment, operating system 102 is in communication with firmware 106 by way of firmware interface 104. Operating system 102 may be any operating system, such as Windows, Linux, IOS, Blackberry, etc. Firmware interface 104 may be any firmware interface, such as a unified extensible firmware interface (UEFI), an extensible firmware interface (EFI), a basic input/output system (BIOS), and/or the like. Firmware 104 may provide various operations and services to operating system 102, such as device-independent graphics interface, variable services, time services, etc.

In at least one example embodiment, operating system 102, firmware interface 104, and firmware 106 comprise modules. In at least one example embodiment, a module relates to a set of operations embodied by a set of instructions for performing the set of operations. A software module may cause invocation of the instructions of another software module to cause performance of the other software module's operations by way of an Interface. A software module may interact with, at least part of, another software module, contain, at least part of, another software module, and/or the like. For example, an operating system module may relate to a set of operations associated with a set of operation services, such as Bluetooth communication, font support, network communication, running a program, and/or the like.

Computing systems are often susceptible to attacks by viruses, attacks by spyware, attacks by malware, affliction with accidental software changes, and/or the like. Such vulnerabilities may manifest themselves into broader concerns, such as fatal booting failure, rootkit threats, compromise of confidential information, persistent attacks, and/or the like.

There may be various risks associated with these concerns. For example, there may be accidental file deletion (for example deletion of a firmware module), accidental misconfiguration (such as utilization of an inappropriate driver), etc.

In another example, there may be critical software and/or data changed, by malice or accident, such as changing an operating system module. In another example, malware, including viruses and worms, may be made to reside in the system to cause ongoing problems, such as persistent privilege escalations, malicious code injection, etc. In still another example, an unwanted, unauthorized, or fraudulent operating system service pack or software patch may be introduced, which may further expose the system to other attacks.

To avoid such afflictions, it may be desirable to be able to restore specific software modules that have been compromised. For example, if an important module has been changed, it may be desirable to be able to recognize that the module has changed, and to restore the module. Furthermore, it may be desirable to avoid introducing a lengthy process of examining all identified software modules during normal user operation of the computing system. Furthermore, it may be desirable to perform examination of identified modules in a layer that is more difficult to infiltrate than the operating system layer, or any possible layer above the operating system. Therefore, for at least any one of these reasons, it may be desirable to provide for restoration by way of the firmware boot process.

Figure 2:
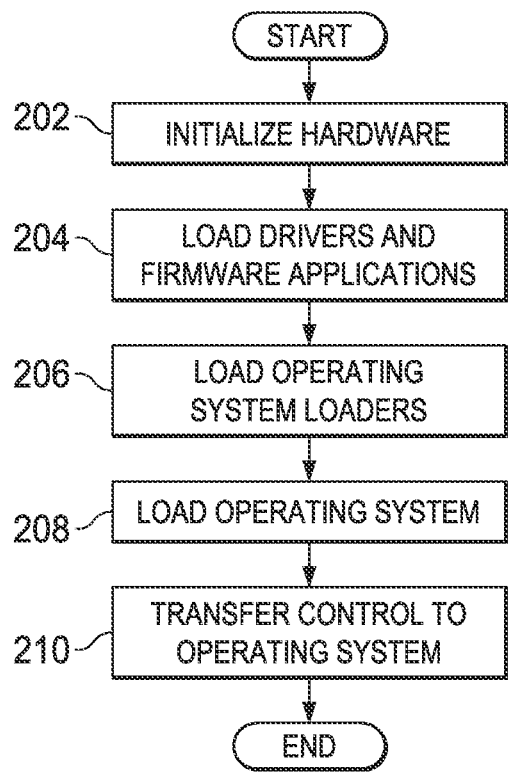
FIG. 2 is simplified flow diagram illustrating a boot process according to at least one example embodiment.

FIG. 2 is simplified flow diagram illustrating a boot process according to at least one example embodiment. In at least one example embodiment, there is a set of operations that corresponds to the activities of FIG. 2. An apparatus, for example computing system 1100 of FIG. 11, or a portion thereof, may utilize the set of operations. The apparatus may comprise means, including, for example processor 1000 of FIG. 10, for performing such operations. In an example embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform the set of operations of FIG. 2. In at least one example embodiment, the activities of FIG. 2 are performed by firmware, such as firmware 106, a firmware interface layer, such as firmware interface 104, and/or the like.

Some of the blocks of FIG. 2 relate to loading of modules. The apparatus may determine which modules to load based on predetermined loading instructions, configuration information, and/or the like. For example, firmware may comprise instructions that specifically govern loading of specific modules. In another example, there may be stored data that indicates modules to be loaded.

At block 202, the apparatus initializes the hardware. Initialization of the hardware may relate to initializing memory, embedded controllers, registers, and/or the like. At block 204, the apparatus loads firmware modules, such as drivers and firmware applications. In at least one example embodiment, loading a module refers to transferring the module code, which is associated with the module, from non-executable memory to executable memory. In at least one example embodiment, executable memory relates to memory from which a processor retrieves code to execute, and non-executable memory relates to memory from which a processor does not retrieve code to execute. In at least one example embodiment, module code relates to a set of computer instructions, comprised by a module, which, when executed by a processor, cause the operations of the module to be performed. For example, if a module provides an operation to load another module, the module code comprises instructions, which, when executed by the processor, cause the loading of the other module to be performed. In at least one example embodiment, a driver relates to a module that provides operations for interacting with a device, such as a bus, an embedded controller, an external device, a sensor, and/or the like. In at least one example embodiment, a firmware application relates to a module that provides operations that do not directly pertain to interaction with a device. Examples of firmware applications may include a boot module, an operating system loader, a resource manager, and/or the like. In at least one example embodiment, a boot module relates to a module having operations for performing boot operations, such as any of the blocks of FIG. 2. In at least one example embodiment, an operating system loader is a module that performs operations associated with loading the operating system, similarly as described regarding block 208. In at least one example embodiment, a resource manager relates to a module having operations associated with regulating interaction with one or more resources, such as one or more devices, one or more modules, one or more regions of memory, and/or the like.

At block 206, the apparatus loads operating system loaders. At block 208, the apparatus loads the operating system. In at least one example embodiment, block 208 utilizes, at least part of, the operating system loaders of block 206 to load one or more operating system modules. At block 210, the apparatus transfers control to the operating system. In at least one example embodiment, transferring control to the operating system comprises branching to an instruction comprised by operating system module code.

Figure 3A:
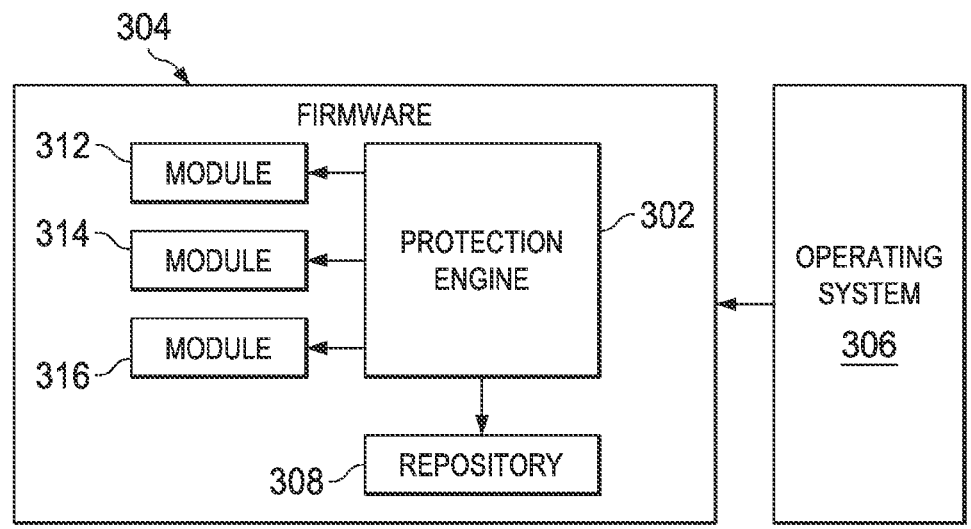
FIG. 3A is a block diagram illustrating software components associated with loading a frozen module according to at least one example embodiment.

FIG. 3A is a block diagram illustrating software components associated with loading a frozen module according to at least one example embodiment. The example of FIG. 3A is merely an example of software components associated with loading a frozen module, and does not limit the scope of the claims. For example, operations attributed to a software component may vary, number of software components may vary, composition of a software component may vary, and/or the like. For example, in some example embodiments, operations attributable to one software component of the example of FIG. 3A may be allocated to one or more other components.

Throughout the operation of an apparatus, there may be modules that have a level of importance to the operation of the apparatus. For example a particular module may be needed for the apparatus to operate as desired. In another example, a particular module may be depended upon by other important modules. In still another example, a particular module may have important associations with memory. In such an example, the module may be a desirable attack target for a malicious actor trying to access that memory.

It may be desirable to be able to detect changes in modules that have a level of importance, and to be able to restore the modules to their desired state. In at least one example embodiment, a module that has been designated to be monitored for changes and to restore if changes occur is referred to as a frozen module. A frozen module relates to a version of the module that represents the version that is desired to be consistent when loaded. For example, loading a module that has been designated as a frozen module may comprise evaluating the module to determine whether it has been changed. In such an example, if the module has been changed, the apparatus may take measures to avoid loading the changed module and load the frozen module instead.

The example of FIG. 3A shows firmware 304 in communication with operating system 306. In the example of FIG. 3A, firmware 304 comprises protection engine 302 in communication with repository 308 and modules 312, 314, and 316. Even though modules 312, 314, and 316 are illustrated as being within firmware 304, the modules may reside at any suitable location. The showing of the modules within firmware 304 is merely to illustrate that, at some point, firmware 304 has control over the module. In at least one example embodiment, the firmware having control of a module may comprise the firmware causing loading of the module, the firmware determining whether to load the module, the firmware causing execution of the module, and/or the like.

In at least one example embodiment, repository 308 is used to store frozen module information. Frozen module information may comprise information associated with a module that has been designated as frozen. In at least one example embodiment, frozen module information may comprise identity information associated with the frozen module, information indicating designation of the module as frozen, a frozen module fingerprint, frozen module code, frozen module code information, frozen module code location information, and/or the like.

In at least one example embodiment, identity information associated with the frozen module comprises information that allows for identification of a module associated with the frozen module information. For example, the identity information of the frozen module information may correspond with identity information associated with a module to be loaded.

In at least one example embodiment, information indicating designation of the module as frozen comprises information that allows determination that a module indicated by the frozen module information has been designated as a frozen module. In at least one example embodiment, repository 308 may omit frozen module information associated with modules that have not been designated as frozen. In such circumstances, the existence of frozen module information associated with a module may serve as information indicating designation of the module as frozen.

In at least one example embodiment, a frozen module fingerprint relates to information that represents the content of the module, such as the module code. The frozen module fingerprint may be a hash value, a timestamp, a random sampling of information from the module code, and/or the like. The frozen module fingerprint may be determined at the time the module becomes frozen, may be predetermined, may be determined when a module is being loaded, and/or the like.

In at least one example embodiment, the frozen module information comprises the frozen module code. For example, the frozen module information may comprise, at least part of, the frozen module code that is to be loaded when the frozen module is caused to be loaded. In at least one example embodiment, the frozen module information omits the frozen module code. In such an embodiment, the frozen module code may be located outside of repository 308, for example in a different part of memory, in memory of a different device, in memory on a different apparatus, and/or the like. In such an example, the frozen module information may comprise frozen module code location information.

In at least one example embodiment, the frozen module code location information comprises information that allows the frozen module code to be retrieved. For example, the frozen module code location information may comprise information indicating the location from which the frozen module code may be retrieved, information indicating authentication information associated with retrieval of the frozen module code, information indicating encryption information associated with the frozen module code, information indicating decryption information associated with the frozen module code, and/or the like. Information indicating the location from which the frozen module code information may be retrieved may relate to an indication of a uniform resource locator (URL), a memory address, and/or the like. In at least one example embodiment, there may be security associated with retrieval of the frozen module code. In such an embodiment, the frozen module code location information may comprise information that allows the apparatus to perform successful authentication, so that the frozen module code may be retrieved. In at least one example embodiment, encrypted communication is utilized in retrieval of the frozen module code. In such an embodiment, the frozen module code location information may comprise encryption information, decryption information, and/or the like, so that the encrypted communication may be performed.

In at least one example embodiment, repository 308 is segregated from operating system access. For example, repository 308 may be located in a region of memory that is not allocated to the operating system, that is prohibited for use by the operating system, and/or the like. However, segregation from operating system access does not necessarily require complete preclusion of access by way of the operating system. For example, there may be circumstances where a program, such as a virus, may be written to overcome segregation from operating system access. In this manner, segregation from operating system access refers to repository 308 being beyond the standard operating access of the operating system, but not necessarily a hard guarantee that it is impossible for operating system access to occur. At least one technical advantage of such segregation is providing additional security for the frozen module information by increasing the difficulty associated with accessing repository 308 by way of a program that is invoked by way of the operating system. Such a technical advantage provides a reduction of risk associated with accidental or malicious changes being made to the frozen module information.

In at least one example embodiment, protection engine 302 evaluates modules to be loaded by the firmware, such as modules 312, 314, and 316, to determine if a module that is to be loaded has been designated as a frozen module. In performing this determination, protection engine 302 may retrieve frozen module information from repository 308. If the module has been designated as a frozen module, protection engine 302 may determine whether the module has changed since being designated as frozen. If the module has changed, protection engine 302 may cause loading of the frozen module code instead of the module code. Causing of the loading of the frozen module code may comprise causing retrieval of the frozen module code, determining location of the frozen module code, preventing loading of the module code, enabling loading of the frozen module code, and/or the like. Even though the loading of the frozen module code may be performed by a firmware module other than protection engine 302, protection engine 302 may cause loading of the frozen module code by designating the frozen module code to be loaded, sending the frozen module code to a loader, and/or the like. In at least one example embodiment, causing of the loading of the frozen module code comprises retrieval of the frozen module code from a frozen module code repository. The frozen module code repository may be a repository designated by the frozen module information, repository 308, and/or the like.

Without limiting the scope of the claims in any way, at least one possible benefit associated with this use of frozen modules is that a change in a frozen module, whether accidental or malicious, could be corrected upon the next computing system boot process. Therefore, such capability may be referred to as a reboot to restore capability, in that any modification to a designated module will not be present in the module after the next boot process. Therefore, an undesired change in a designated module may be corrected merely by rebooting the computing system. In this manner, the computing system does not necessarily need to preclude any change to a designated module, but may rely on correction by way of rebooting as a restorative measure. Such restorative measures may be applied instead of or in addition to preventative measures, such as precluding a change in a designated module.

Figure 3B:
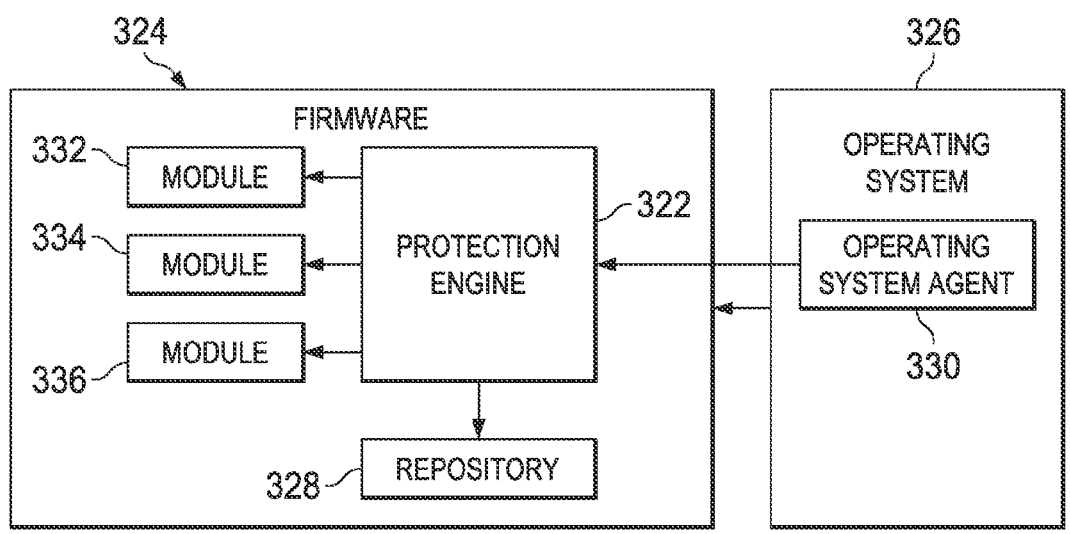
FIG. 3B is another block diagram illustrating software components associated with loading a frozen module according to at least one example embodiment.

FIG. 3B is a block diagram illustrating software components associated with loading a frozen module according to at least one example embodiment. The example of FIG. 3B is merely an example of software components associated with loading a frozen module, and does not limit the scope of the claims. For example, operations attributed to a software component may vary, number of software components may vary, composition of a software component may vary, and/or the like. For example, in some example embodiments, operations attributable to one software component of the example of FIG. 3B may be allocated to one or more other components.

The example of FIG. 3B shows firmware 324 in communication with operating system 326. In the example of FIG. 3B, firmware 324 comprises protection engine 322 in communication with repository 328 and modules 332, 334, and 336. Even though modules 332, 334, and 336 are illustrated as being within firmware 324, the modules may reside at any suitable location. The showing of the modules within firmware 324 is merely to illustrate that, at some point, firmware 324 has control over the module. In at least one example embodiment, the firmware having control of a module may comprise the firmware causing loading of the module, the firmware determining whether to load the module, the firmware causing execution of the module, and/or the like. In the example of FIG. 3B, operating system 326 comprises operating system agent 330, which is in communication with protection engine 322. In at least one example embodiment, protection engine 322 is similar as described regarding protection engine 302, repository 328 is similar as described regarding repository 308, and modules 332, 334, and 336 are similar as described regarding modules 312, 314, and 316.

In at least one example embodiment, operating system agent 330 relates to a program that is operating within the operating system and that has adequate privilege to interact with the protection engine 322. In at least one example embodiment, an administrator may designate one or more operating system agents that may be utilized by a user. In at least one example embodiment, the administrator may utilize an operating system agent to interact with protection engine 322. There may be policy information governing the type of interaction that may take place between the operating system agent and the protection engine. For example, an operating system agent that has been provided for utilization by the user may be able to interact with protection engine 322 using only a subset of the interactions available to an operating system agent provided for use by an administrator.

In at least one example embodiment, it may be desirable to allow frozen module information to be set, changed, removed, and/or the like. For example, a user may desire to avoid a future corruption of an important module, and may designate the module as a frozen module. In another example, an enterprise system administrator may wish to load a set of modules to a computing system as frozen modules to be loaded upon the next reboot of the computing system. Under such circumstances, it may be desirable to allow change of frozen module information by way of protection engine 322. In another example, a system administrator may desire to provide a set of modules associated with the firmware. In such an example, the administrator may desire for the modules to be protected from inadvertent or malicious change, and utilize operating system agent 330 to cause storage of frozen module information associated with the desired modules. In another example, the administrator may desire to change a frozen module, for example to correct for an error in the frozen module, to improve compatibility of the frozen module, and/or the like. In such an example, the administrator may utilize operating system agent 330 to cause replacement of existing frozen module information with the changed frozen module information. Such a change may relate to a change in only a part of the frozen module information, such as frozen module code location information, frozen module identity information, and/or the like. The administrator may utilize the operating system agent for any module that the administrator has adequate privilege to control. For example, the operating system agent may provide frozen module information for a driver module, for a firmware application module, for an operating system loader module, for an operating system module, and/or the like. Therefore, in some circumstances, an administrator may deploy operating system patches, firmware patches, and/or the like, by way of sending frozen module information to protection engine 322. Under such circumstances, a subsequent boot of the apparatus will cause loading of the deployed frozen modules.

Without limiting the scope of the claims in any way, at least one technical advantage associated with an operating system agent being able to perform in this manner is allowing of configuration and management of modules after a computing system is deployed. At least another possible technical advantage associated with an operating system agent performing in this manner is to utilize existing mechanisms for administrative privilege in managing the frozen module information.

In at least one example embodiment, operating system agent 330 provides frozen module information to protection engine 322. For example, operating system agent 330 may send a directive to protection engine 322 regarding change of at least part of frozen module information. The directive may relate to a message, a function call, and/or the like, that communicates a desire to change, at least part of, the frozen module information. The change in frozen module information may relate to designation of a module as a frozen module, where the module that had previously been undesignated as a frozen module. The change in frozen module information may relate to removing designation of a module as a frozen module. The change may relate to a change in frozen module location information, a change in frozen module code, a change in frozen module fingerprint, and/or the like. In at least one example embodiment, the directive designates a frozen module code repository in which the frozen module code is to be stored and/or has been stored. As previously described, the directive may be a user directive, an administrator directive, and/or the like. Upon receiving the directive, protection engine 322 may cause storage of the frozen module information indicated by the directive in repository 328.

Figure 3C:
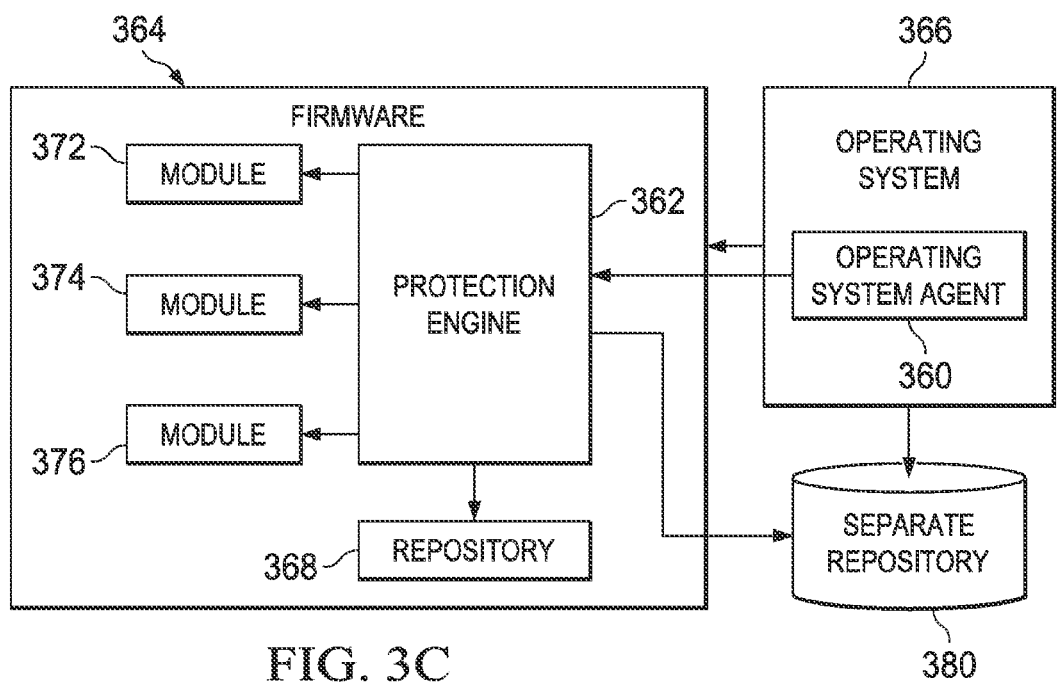
FIG. 3C is yet another block diagram illustrating software components associated with loading a frozen module according to at least one example embodiment.

FIG. 3C is a block diagram illustrating software components associated with loading a frozen module according to at least one example embodiment. The example of FIG. 3C is merely an example of software components associated with loading a frozen module, and does not limit the scope of the claims. For example, operations attributed to a software component may vary, number of software components may vary, composition of a software component may vary, and/or the like. For example, in some example embodiments, operations attributable to one software component of the example of FIG. 3C may be allocated to one or more other components.

In at least one example embodiment, it may be desirable for the frozen module code to be stored externally to the computing system, such as a separate repository. For example, in an enterprise environment, there may be multiple computing systems that utilize one or more of the same frozen modules. In such circumstances, it may be desirable to provide a repository that may be accessed by any one of the multiple computing systems in the enterprise that may need to access the frozen module code. Without limiting the claims in any way, at least one technical advantage of such an arrangement may be to reduce the amount of memory of each computing system associated with storing frozen module code, to simplify deployment of frozen module code to multiple computing systems, to improve oversight of the frozen module code utilized by multiple computing systems, etc.

The example of FIG. 3C shows firmware 364 in communication with operating system 366. In the example of FIG. 3C, firmware 364 comprises protection engine 362 in communication with repository 368 and modules 372, 374, and 376. Even though modules 372, 374, and 376 are illustrated as being within firmware 364, the modules may reside at any suitable location. The showing of the modules within firmware 364 is merely to illustrate that, at some point, firmware 364 has control over the module. In at least one example embodiment, the firmware having control of a module may comprise the firmware causing loading of the module, the firmware determining whether to load the module, the firmware causing execution of the module, and/or the like. In the example of FIG. 3C, operating system 366 comprises operating system agent 360, which is in communication with protection engine 362. In the example of FIG. 3C, protection engine 362 is in communication, at least indirectly, with a separate repository 380. In some circumstances, operating system 366 may be in communication, at least indirectly, with separate repository 380. In at least one example embodiment, separate repository 380 is external to the apparatus comprising firmware 364, for example a server, a database, etc., and the apparatus may access the repository via an external communication channel, such as the internet. In at least one example embodiment, protection engine 362 is similar as described regarding protection engine 322, repository 368 is similar as described regarding repository 328, operating system agent 360 is similar as described regarding operating system agent 330, and modules 372, 374, and 376 are similar as described regarding modules 332, 334, and 336.

In an example embodiment, operating system agent 360 may provide a directive to change frozen module information regarding frozen module code stored in separate repository 380. In such an embodiment, the directive may omit frozen module code. The directive may comprise frozen code location information indicative of separate repository 380. Protection engine 362 may cause storage of frozen module information associated with the directive, which comprises the frozen module code location information, in repository 368. If the frozen module designated by the directive has other frozen module code stored elsewhere, protection engine 362 may cause deletion of the other frozen module code. For example, if there is frozen module code stored in repository 368, and protection engine 362 receives a directive to change the frozen module location information associated with the frozen module to be indicative of separate repository 380, protection engine 362 may cause deletion of the frozen module code that was stored in repository 368. In such an example, the directive designates the separate repository to be associated with the frozen module code location information.

In an example embodiment, in a circumstance where a module is designated as a frozen module with frozen module code location information indicating separate repository 380, when protection engine 362 determines that the module has changed, protection engine causes retrieval of the frozen module code from separate repository 380. For example, protection engine 362 may utilize a communication driver, such as a network communication driver, a cellular communication driver, and/or the like, to cause retrieval of the frozen module code from separate repository 380.

Figure 4:
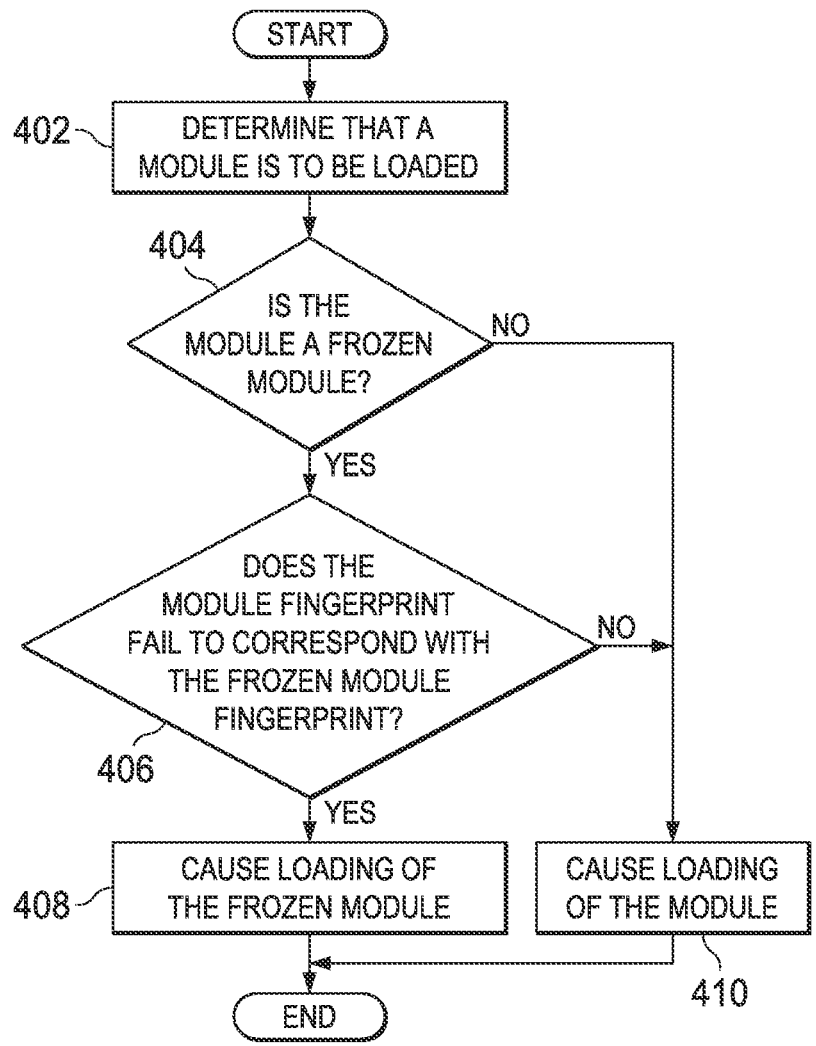
FIG. 4 is a flow diagram illustrating activities associated with loading a frozen module according to at least one example embodiment.

FIG. 4 is a flow diagram illustrating activities associated with providing software security according to at least one example embodiment. In at least one example embodiment, there is a set of operations that corresponds to the activities of FIG. 4. An apparatus, for example computing system 1100 of FIG. 11, or a portion thereof, may utilize the set of operations. The apparatus may comprise means, including, for example processor 1000 of FIG. 10, for performing such operations. In an example embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform set of operations of FIG. 4. In at least one example embodiment, the activities of FIG. 4 are performed by firmware, such as firmware 106, a firmware interface layer, such as firmware interface 104, a protection engine, such as protection engine 302, and/or the like.

At block 402, the apparatus determines that a module is to be loaded. The determination to load a module may be similar as described regarding FIG. 2. In at least one example embodiment, determination that a module is to be loaded may be based on receipt of an indication that the module will be loaded. For example, a module that is associated with performing the loading, such as a loader, may provide an indication that the module is to be loaded.

At block 404, the apparatus determines whether the module is a frozen module. If the apparatus determines that the module is not a frozen module, flow proceeds to block 410. If the apparatus determines that the module is a frozen module, flow proceeds to block 406. Determination of whether the module is a frozen module may be based, at least in part, on frozen module information. For example, the apparatus may determine that frozen module identity information corresponds with identity information of the module. In at least one example embodiment, determining whether the module is a frozen module is predicated on determination that the module is to be loaded.

At block 406, the apparatus determines whether the module fingerprint fails to correspond with the frozen module fingerprint. The module fingerprint may be similar as described regarding FIGS. 3A-3C. If the apparatus determines that the module fingerprint fails to correspond with the frozen module fingerprint, flow proceeds to block 408. If the apparatus determines that the module fingerprint corresponds with the frozen module fingerprint, flow proceeds to block 410. Block 406 may further comprise determining the module fingerprint. It may be desirable to omit utilization of a stored module fingerprint so that the content of the module is analyzed. For example, a stored fingerprint may not necessarily reflect the actual fingerprint of the module.

At block 408, the apparatus causes loading of the frozen module code. The loading of the frozen module code may be performed instead of the loading of the module code. The apparatus may cause loading of the frozen module code by performing the loading of the frozen module code, providing a directive to load the frozen module code, providing the frozen module code to be loaded instead of providing the module code to be loaded, and/or the like.

At block 410, the apparatus causes loading of the module code, similar as described regarding FIG. 2. The apparatus may cause loading of the module code by performing the loading of the module code, by providing a directive to load the module code, by failing to provide a directive to load the frozen module code, by providing the module code to be loaded, by failing to provide the frozen module code to be loaded, and/or the like.

Figure 5:
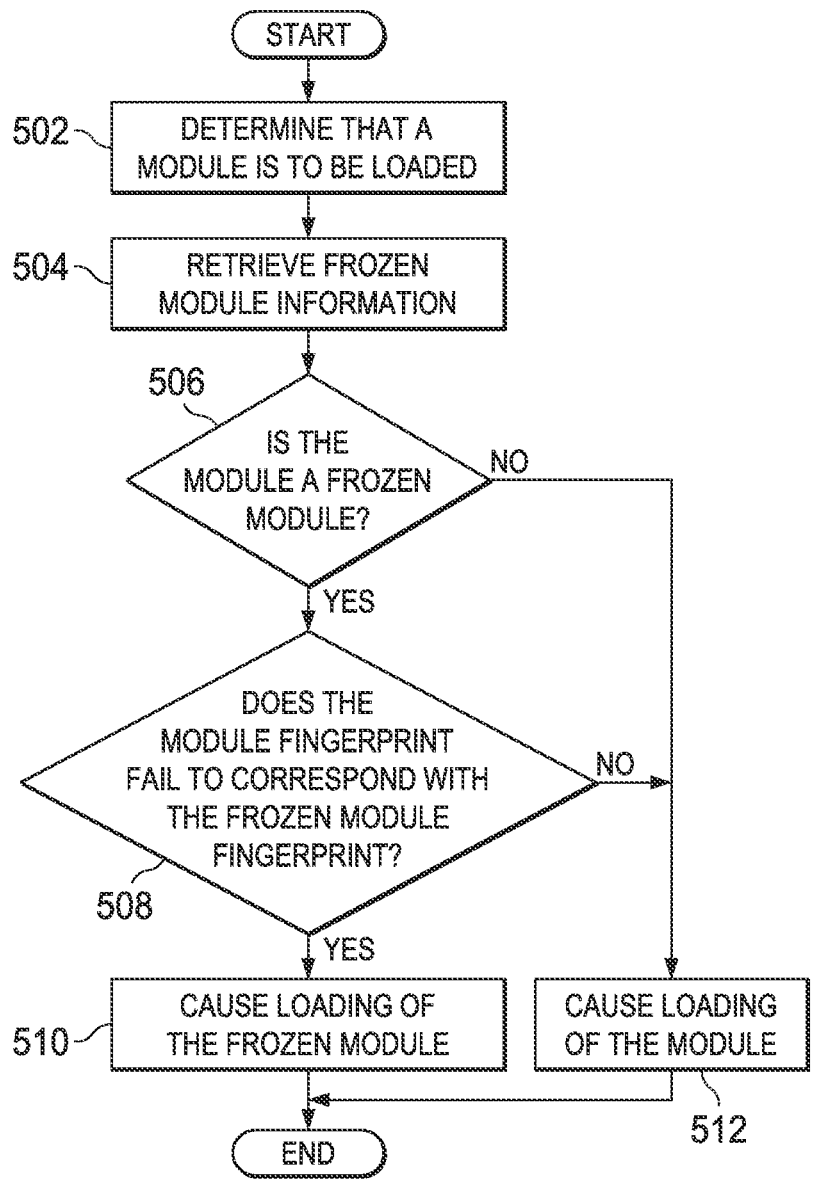
FIG. 5 is another flow diagram illustrating activities associated with loading a frozen module according to at least one example embodiment.

FIG. 5 is another flow diagram illustrating activities associated with loading a frozen module according to at least one example embodiment. In at least one example embodiment, there is a set of operations that corresponds to the activities of FIG. 5. An apparatus, for example computing system 1100 of FIG. 11, or a portion thereof, may utilize the set of operations. The apparatus may comprise means, including, for example processor 1000 of FIG. 10, for performing such operations. In an example embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform the set of operations of FIG. 5. In at least one example embodiment, the activities of FIG. 5 are performed by firmware, such as firmware 106, a firmware interface layer, such as firmware interface 104, a protection engine, such as protection engine 302, and/or the like.

At block 502, the apparatus determines that a module is to be loaded, similar as described regarding block 402 of FIG. 4. At block 504, the apparatus retrieves frozen module information similar as described regarding FIGS. 3A-3C.

At block 506, the apparatus determines whether the module is a frozen module, similar as described regarding block 404 of FIG. 4. If the apparatus determines that the module is not a frozen module, flow proceeds to block 512. If the apparatus determines that the module is a frozen module, flow proceeds to block 508. The determination may be based on the frozen module information. For example the frozen module information may comprise the frozen module identity, and determination that the module is a frozen module may be based on the module identity corresponding to the frozen module identity. In another example, determination that a module is not a frozen module may be based, at least in part, on determination that the frozen module information is absent a frozen module identity that corresponds with the module identity.

At block 508, the apparatus determines whether the module fingerprint fails to correspond with the frozen module fingerprint similar as described regarding block 406 of FIG. 4. If the apparatus determines that the module fingerprint corresponds with the frozen module fingerprint, flow proceeds to block 512. If the apparatus determines that the module fingerprint fails to correspond with the frozen module fingerprint, flow proceeds to block 510. The determination may be based on the frozen module information. For example, the frozen module information may comprise the frozen module fingerprint, and determination that the module fingerprint fails to correspond with the frozen module fingerprint may be based on the module fingerprint failing to correspond to the frozen module fingerprint of the frozen module information.

At block 510, the apparatus causes loading of the frozen module code similar as described regarding block 408 of FIG. 4. At block 512, the apparatus causes loading of the module code, similar as described regarding block 410 of FIG. 4.

Figure 6:
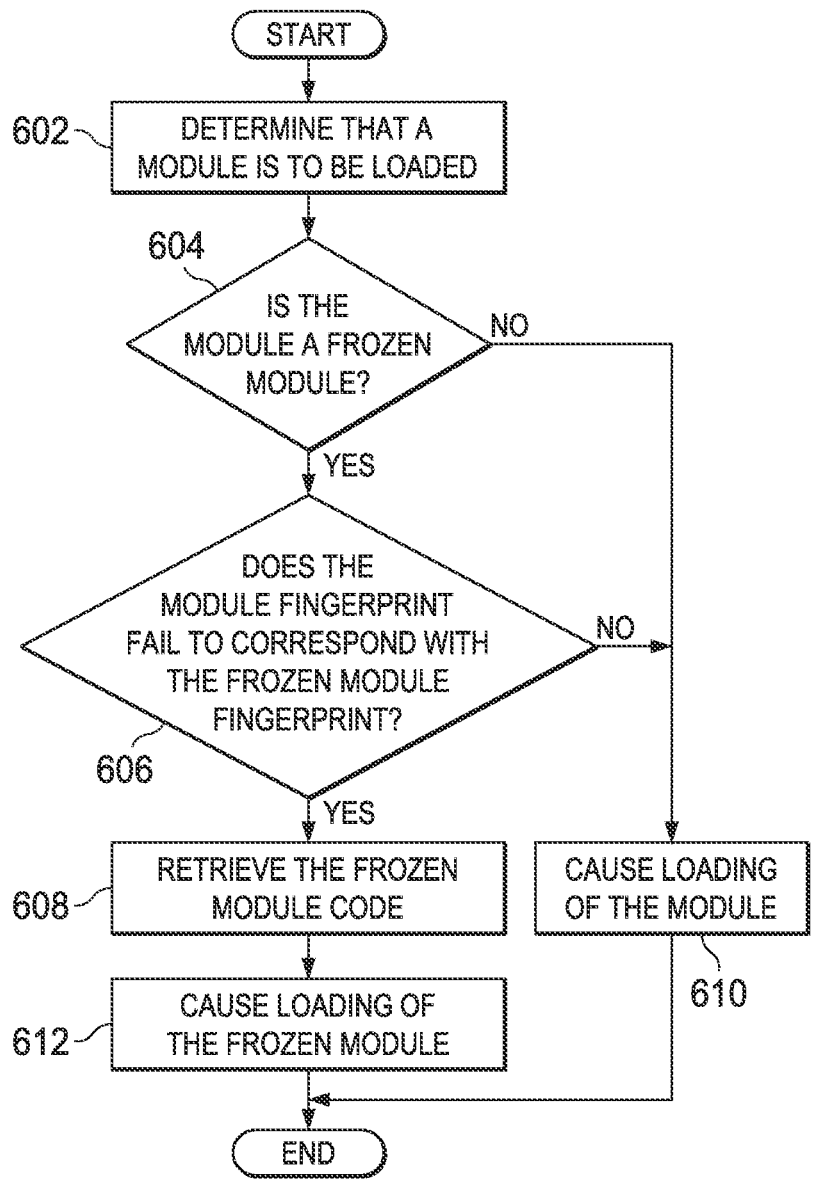
FIG. 6 is still another flow diagram illustrating activities associated with loading a frozen module according to at least one example embodiment.

FIG. 6 is still another flow diagram illustrating activities associated with loading a frozen module according to at least one example embodiment. In at least one example embodiment, there is a set of operations that corresponds to the activities of FIG. 6. An apparatus, for example computing system 1100 of FIG. 11, or a portion thereof, may utilize the set of operations. The apparatus may comprise means, including, for example processor 1000 of FIG. 10, for performing such operations. In an example embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform the set of operations of FIG. 6. In at least one example embodiment, the activities of FIG. 6 are performed by firmware, such as firmware 106, a firmware interface layer, such as firmware interface 104, a protection engine, such as protection engine 302, and/or the like.

At block 602, the apparatus determines that a module is to be loaded, similar as described regarding block 402 of FIG. 4. At block 604, the apparatus determines whether the module is a frozen module, similar as described regarding block 404 of FIG. 4. If the apparatus determines that the module is not a frozen module, flow proceeds to block 610. If the apparatus determines that the module is a frozen module, flow proceeds to block 606.

At block 606, the apparatus determines whether the module fingerprint fails to correspond with the frozen module fingerprint similar as described regarding block 406 of FIG. 4. If the apparatus determines that the module fingerprint fails to correspond with the frozen module fingerprint, flow proceeds to block 608. If the apparatus determines that the module fingerprint corresponds with the frozen module fingerprint, flow proceeds to block 610. At block 608, the apparatus retrieves the frozen module code, similar as described regarding FIGS. 3A-3C. The retrieval may be from a frozen module code repository. The frozen module code repository may be similar as described regarding FIGS. 3A-3C. At block 610, the apparatus causes loading of the module code, similar as described regarding block 410 of FIG. 4. At block 612, the apparatus causes loading of the frozen module code similar as described regarding block 408 of FIG. 4.

Figure 7:
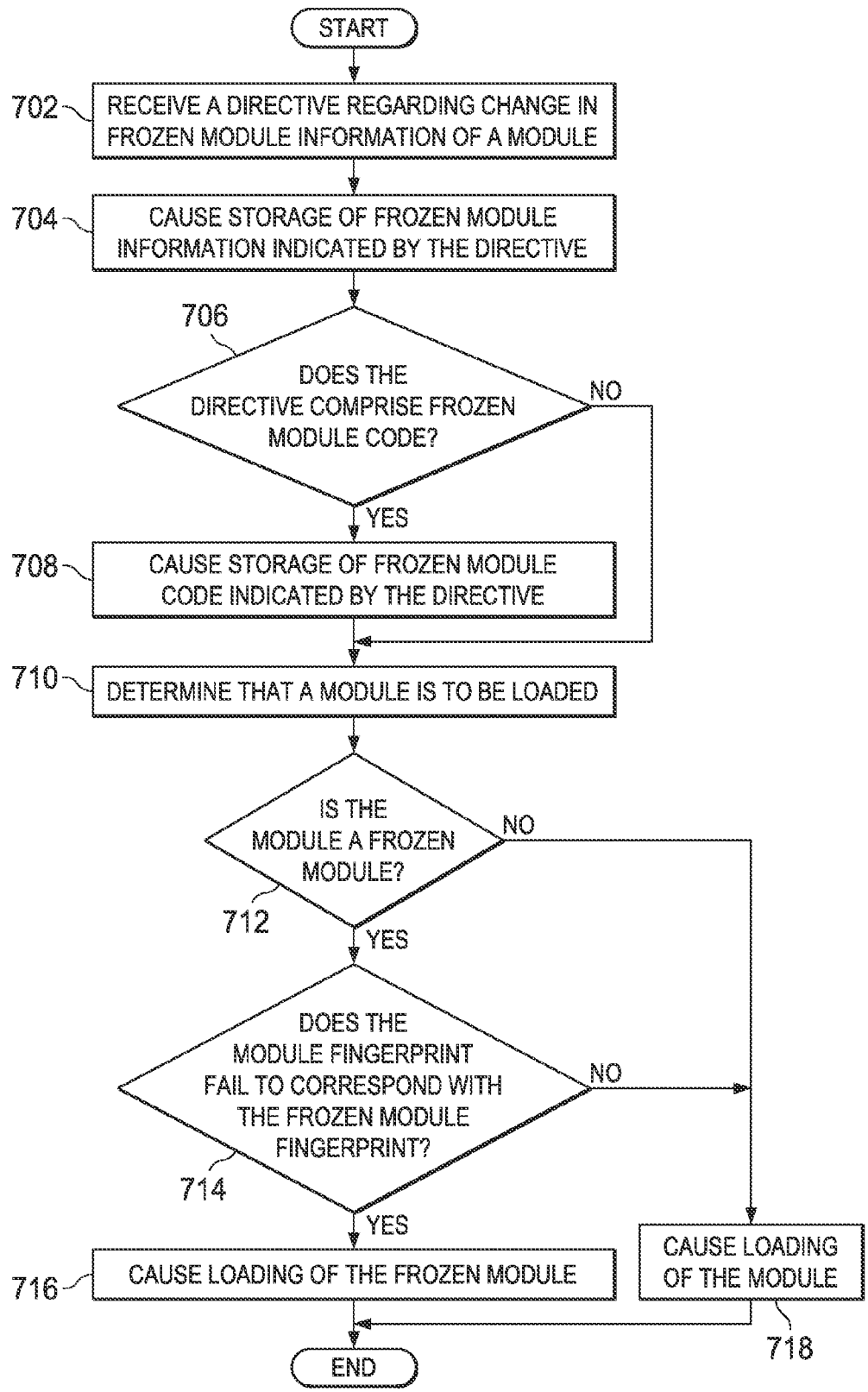
FIG. 7 is yet another flow diagram illustrating activities associated with loading a frozen module according to at least one example embodiment.

FIG. 7 is yet another flow diagram illustrating activities associated with loading a frozen module according to at least one example embodiment. In at least one example embodiment, there is a set of operations that corresponds to the activities of FIG. 7. An apparatus, for example computing system 1100 of FIG. 11, or a portion thereof, may utilize the set of operations. The apparatus may comprise means, including, for example processor 1000 of FIG. 10, for performing such operations. In an example embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform the set of operations of FIG. 7. In at least one example embodiment, the activities of FIG. 7 are performed by firmware, such as firmware 106, a firmware interface layer, such as firmware interface 104, a protection engine, such as protection engine 302, and/or the like.

At block 702, the apparatus receives a directive regarding change of, at least part of, frozen module information similar as described regarding FIGS. 3B-3C. The change may relate to designation as a frozen module, change in frozen module code, change in frozen module code location information, and/or the like.

At block 704, the apparatus causes storage of the frozen module information indicated by the directive, similar as described regarding FIGS. 3B-3C. Storage may be caused by performing the storage, by providing the frozen module information to a module for storage, by sending a directive to store the frozen module information, and/or the like.

At block 706, the apparatus determines whether the directive comprises frozen module code. If the apparatus determines that the directive fails to comprise frozen module code, flow proceeds, at least indirectly, to block 710. If the apparatus determines that the directive comprises frozen module code, flow proceeds to block 708.

At block 708, the apparatus causes storage of the frozen module code indicated by the directive. Storage may be caused by performing the storage, by providing the frozen module information to a module for storage, by sending a directive to store the frozen module information, and/or the like. The frozen module may be stored in a frozen module code repository. The frozen module code repository may be similar as described regarding FIGS. 3A-3C.

It should be understood that in many circumstances, blocks 702, 704, 706, and 708 may be performed after a boot process has taken place, for example during a time when the operating system is in control of the computing system. In many circumstances, block 710 will be performed as part of a boot process, for example after initiation of a reboot at a point in time subsequent to block 706 or block 708. Therefore, even though the example of FIG. 7 shows flow proceeding directly to block 710, there may be many actions performed before block 7, such as a reboot, that are omitted from FIG. 7.

At block 710, the apparatus determines that a module is to be loaded, similar as described regarding block 402 of FIG. 4. At block 712, the apparatus determines whether the module is a frozen module, similar as described regarding block 404 of FIG. 4. If the apparatus determines that the module is not a frozen module, flow proceeds to block 718. If the apparatus determines that the module is a frozen module, flow proceeds to block 714. At block 714, the apparatus determines whether the module fingerprint fails to correspond with the frozen module fingerprint similar as described regarding block 406 of FIG. 4. If the apparatus determines that the module fingerprint corresponds with the frozen module fingerprint, flow proceeds to block 718. If the apparatus determines that the module fingerprint fails to correspond with the frozen module fingerprint, flow proceeds to block 716. At block 716, the apparatus causes loading of the frozen module code similar as described regarding block 408 of FIG. 4. At block 718, the apparatus causes loading of the module code, similar as described regarding block 410 of FIG. 4.

Figure 8:
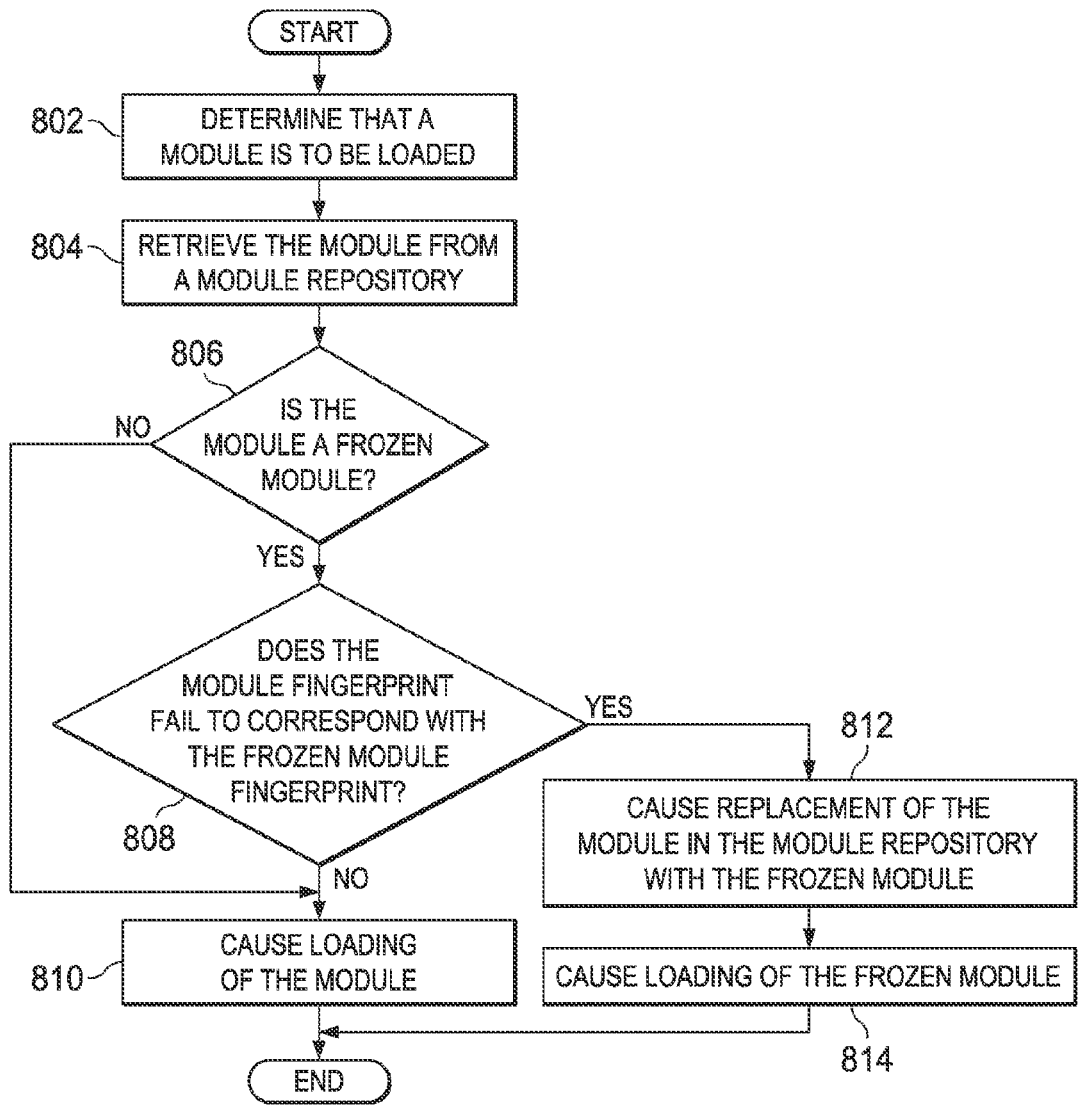
FIG. 8 is even another flow diagram illustrating activities associated with loading a frozen module according to at least one example embodiment.

FIG. 8 is even another flow diagram illustrating activities associated with loading a frozen module according to at least one example embodiment. In at least one example embodiment, there is a set of operations that corresponds to the activities of FIG. 8. An apparatus, for example computing system 1100 of FIG. 11, or a portion thereof, may utilize the set of operations. The apparatus may comprise means, including, for example processor 1000 of FIG. 10, for performing such operations. In an example embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform the set of operations of FIG. 8. In at least one example embodiment, the activities of FIG. 8 are performed by firmware, such as firmware 106, a firmware interface layer, such as firmware interface 104, a protection engine, such as protection engine 302, and/or the like.

In at least one example embodiment, the modules are stored separately from the frozen modules. For example, the frozen modules may be stored in memory that is segregated from the operating system, and the modules may be stored in memory unsegregated from the operating system. In another example, the frozen module code may be stored in memory that is segregated from the operating system, and the module code may be stored in memory unsegregated from the operating system. Without limiting the claims in any way, at least one technical advantage associated with such storage arrangements may be to reduce the amount of memory associated with module storage that is segregated from an operating system. For example, it may be beneficial to provide as much memory as possible to the operating system. Therefore, such a storage arrangement may allow for more memory to be provided to the operating system. Under such circumstances, it may be desirable to replace module code associated with a module that fails to correspond to its frozen counterpart. The location of storage of the module may be referred to as the module repository.

At block 802, the apparatus determines that a module is to be loaded, similar as described regarding block 402 of FIG. 4. At block 804, the apparatus retrieves the module from a module repository. At block 806, the apparatus determines whether the module is a frozen module, similar as described regarding block 404 of FIG. 4. If the apparatus determines that the module is not a frozen module, flow proceeds to block 810. If the apparatus determines that the module is a frozen module, flow proceeds to block 812.

At block 808, the apparatus determines whether the module fingerprint fails to correspond with the frozen module fingerprint similar as described regarding block 406 of FIG. 4. If the apparatus determines that the module fingerprint corresponds with the frozen module fingerprint, flow proceeds to block 810. If the apparatus determines that the module fingerprint fails to correspond with the frozen module fingerprint, flow proceeds to block 812.

At block 810, the apparatus causes loading of the module code, similar as described regarding block 410 of FIG. 4. At block 812, the apparatus causes replacement of the module in the module repository with the frozen module. For example, the apparatus may cause the frozen module code to be stored in the module repository such that the next retrieval of the module retrieves the stored frozen module code instead of the module code that was retrieved at block 804.

At block 814, the apparatus causes loading of the frozen module code similar as described regarding block 408 of FIG. 4.

Figure 9:
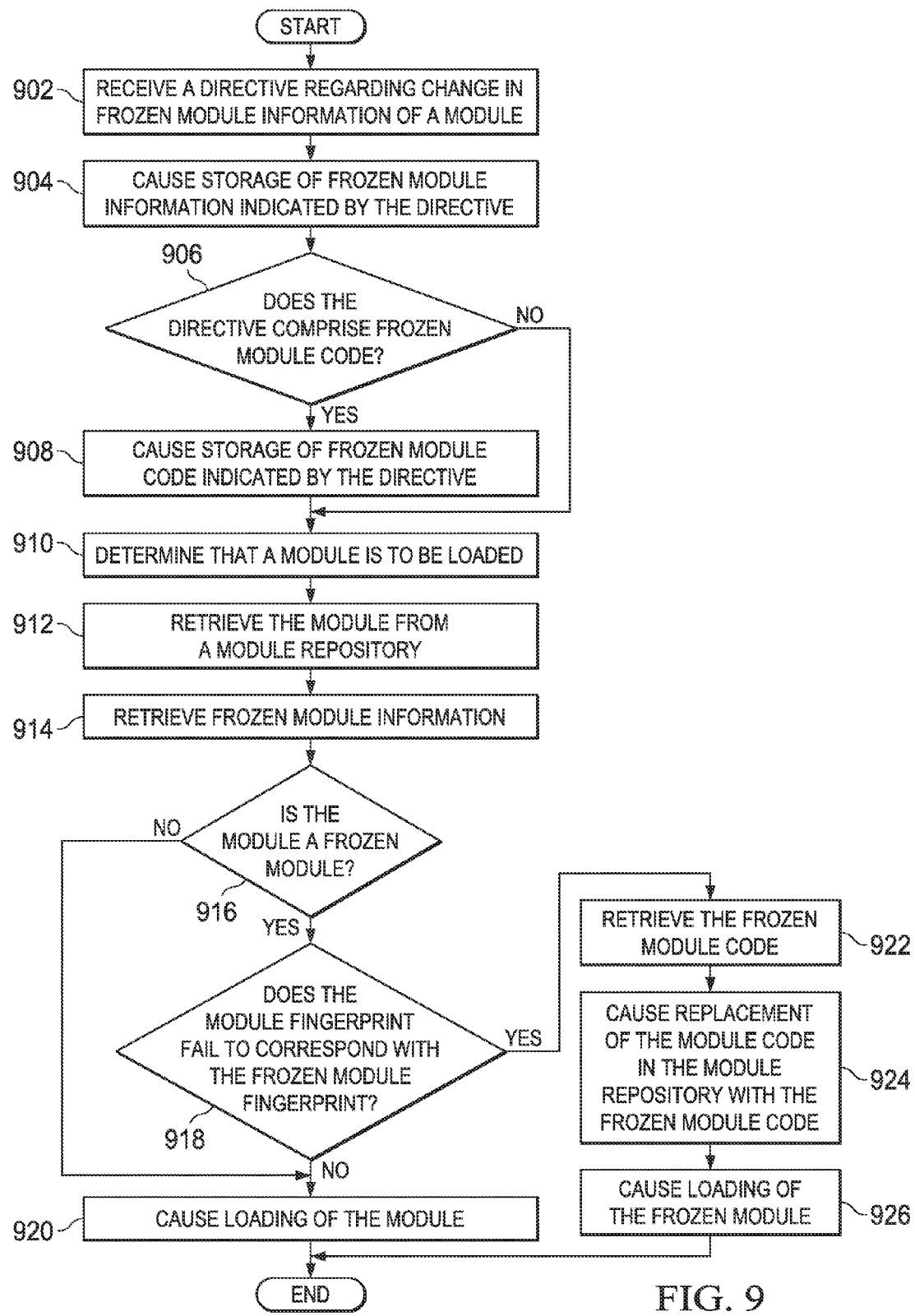
FIG. 9 is yet still another flow diagram illustrating activities associated with loading a frozen module according to at least one example embodiment.

FIG. 9 is a flow diagram illustrating activities associated with providing software security according to at least one example embodiment. In at least one example embodiment, there is a set of operations that corresponds to the activities of FIG. 9. An apparatus, for example computing system 1100 of FIG. 11, or a portion thereof, may utilize the set of operations. The apparatus may comprise means, including, for example processor 1000 of FIG. 10, for performing such operations. In an example embodiment, an apparatus, for example computing system 1100 of FIG. 11, is transformed by having memory, for example memory 1110 of FIG. 11, comprising computer code configured to, working with a processor, for example processor 1102 of FIG. 11, cause the apparatus to perform the set of operations of FIG. 9. In at least one example embodiment, the activities of FIG. 9 are performed by firmware, such as firmware 106, a firmware interface layer, such as firmware interface 104, a protection engine, such as protection engine 302, and/or the like.

At block 902, the apparatus receives a directive regarding change of, at least part of, frozen module information similar as described regarding block 702 of FIG. 7. At block 904, the apparatus causes storage of the frozen module information indicated by the directive, similar as described regarding block 704 of FIG. 7. At block 906, the apparatus determines whether the directive comprises frozen module code similar as described regarding block 706 of FIG. 7. If the apparatus determines that the directive fails to comprise frozen module code, flow proceeds, at least indirectly, to block 910. If the apparatus determines that the directive comprises frozen module code, flow proceeds to block 908.

At block 908, the apparatus causes storage of the frozen module code indicated by the directive similar as described regarding block 708 of FIG. 7.

It should be understood that in many circumstances, blocks 902, 904, 906, and 908 may be performed after a boot process has taken place, for example during a time when the operating system is in control of the computing system. In many circumstances, block 910 will be performed as part of a boot process, for example after initiation of a reboot at a point in time subsequent to block 906 or block 908. Therefore, even though the example of FIG. 9 shows flow proceeding directly to block 910, there may be many actions performed before block 9, such as a reboot, that are omitted from FIG. 9.

At block 910, the apparatus determines that a module is to be loaded, similar as described regarding block 402 of FIG. 4. At block 912, the apparatus retrieves the module from a module repository, similar as described regarding block 804 of FIG. 8. At block 914, the apparatus retrieves frozen module information similar as described regarding block 504 of FIG. 5. At block 916, the apparatus determines whether the module is a frozen module, similar as described regarding block 404 of FIG. 4. If the apparatus determines that the module is not a frozen module, flow proceeds to block 920. If the apparatus determines that the module is a frozen module, flow proceeds to block 922. At block 918, the apparatus determines whether the module fingerprint fails to correspond with the frozen module fingerprint similar as described regarding block 406 of FIG. 4. If the apparatus determines that the module fingerprint corresponds with the frozen module fingerprint, flow proceeds to block 920. If the apparatus determines that the module fingerprint fails to correspond with the frozen module fingerprint, flow proceeds to block 922. At block 920, the apparatus causes loading of the module code, similar as described regarding block 410 of FIG. 4. At block 922, the apparatus retrieves the frozen module code, similar as described regarding block 608 of FIG. 6. At block 924, the apparatus causes replacement of the module code in the module repository with the frozen module code similar as described regarding block 812 of FIG. 8. At block 926, the apparatus causes loading of the frozen module code similar as described regarding block 408 of FIG. 4.

Figure 10:
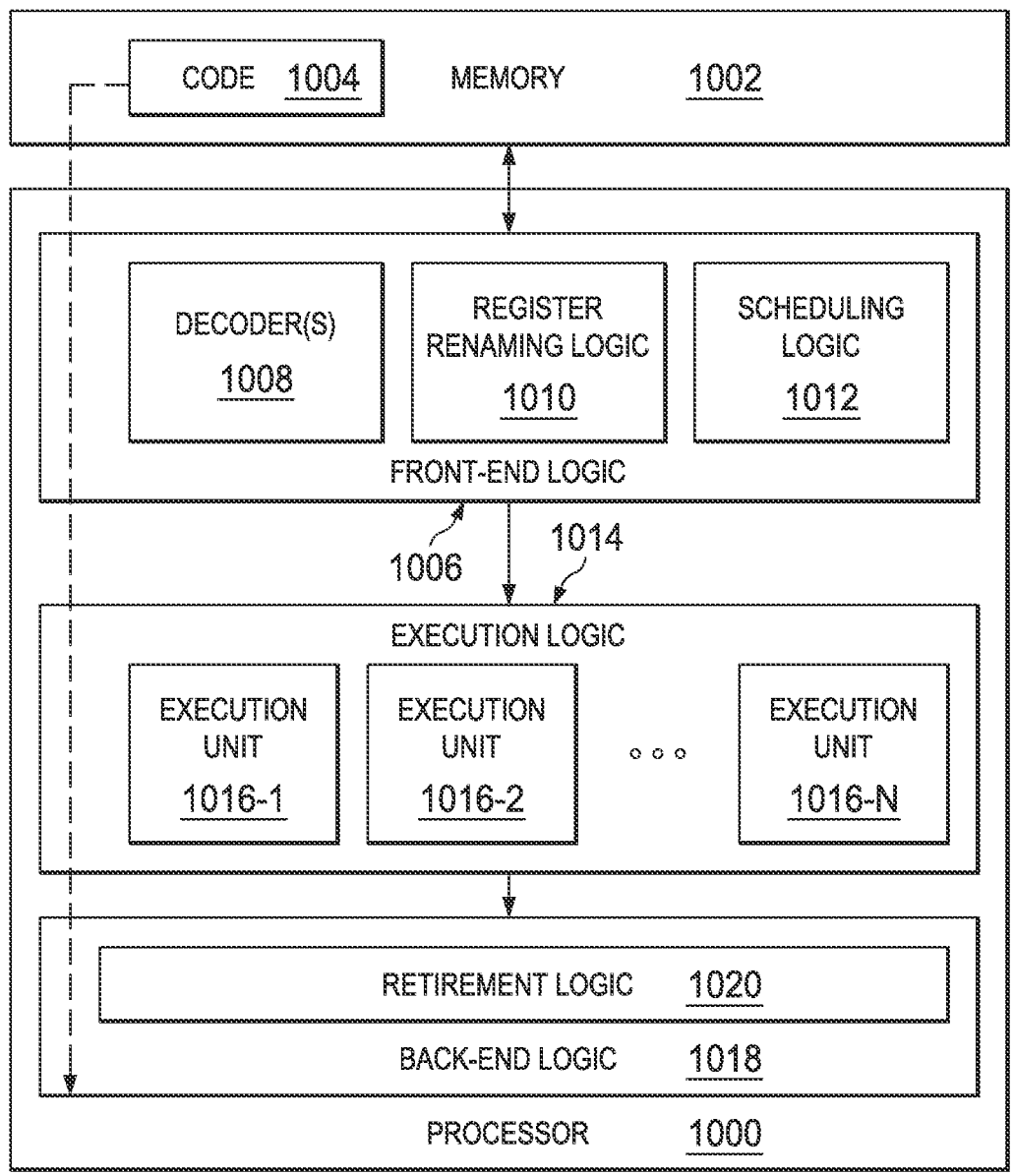
FIG. 10 is a block diagram showing a memory coupled to processor in accordance with an embodiment.

FIG. 10 illustrates a memory 1002 coupled to processor 1000 in accordance with at least one example embodiment. Memory 1002 may be any of a wide variety of memories (including various layers of memory hierarchy). The memory 1002 may include code 1004, which may be one or more instructions, to be executed by processor 1000. Processor 1000 follows a program sequence of instructions indicated by code 1004. In at least one example embodiment, an instruction enters a front-end logic 1006 and is processed by one or more decoders 1008. The decoder may generate a micro operation such as a fixed width micro operation in a predefined format, or may generate other instructions, microinstructions, control signals, and/or the like, that represent the instruction. Front-end logic 1006 also includes register renaming logic 1010 and scheduling logic 1012, which may allocate resources and queue the micro operation.

Processor 1000 is shown including execution logic 1014 having a set of execution units 1016-1 through 1016-N. At least one example embodiment includes a number of execution units dedicated to specific functions or sets of functions. At least one example embodiment includes only one execution unit or one execution unit that can perform a particular function. Execution logic 1014 executes the micro operation.

After completion of execution of the micro operations, back-end logic 1018 retires the instructions of code 1004. In one embodiment, processor 1000 allows out of order execution but enforces in order retirement of instructions. Retirement logic 1020 may take a variety of forms (e.g., re-order buffers or the like). In this manner, processor 1000 is transformed during execution of code 1004, at least in terms of the output generated by the decoder, hardware registers, and tables utilized by register renaming logic 1010, and any registers (not shown) modified by execution logic 1014.

Although not illustrated in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces.

As illustrated in FIG. 11, system 1100 may include several processors, of which only two, processors 1102 and 1104, are shown for clarity. Processors 1102 and 1104 may each include a set of cores 1103 and 1105, which may execute multiple processes of a program. Processors 1102 and 1104 may also each include integrated memory controller logic (MC) 1106 and 1108 to communicate with memories 1110 and 1112, respectively. The memories 1110 and/or 1112 may store various data such as those discussed with reference to memory 1112. In at least one example embodiment, memory controller logic 1106 and 1108 is discrete logic separate from processors 1102 and 1104.

Processors 1102 and 1104 may be any type of a processor. Processors 1102 and 1104 may exchange data via a point-to-point (PtP) interface 1114 using point-to-point interface circuits 1116 and 1118, respectively. Processors 1102 and 1104 may each exchange data with a chipset 1120 via individual point-to-point interfaces 1122 and 1124 using point-to-point interface circuits 1126, 1128, 1130, and 1132. Chipset 1120 may exchange data with a high-performance graphics circuit 1134 via a high-performance graphics interface 1136, using an interface circuit 1137, which could be a PtP interface circuit. In at least one example embodiment, any or all of the PtP links illustrated in FIG. 11 could be implemented as a multi-drop bus rather than a PtP link.

At least one example embodiment, as disclosed herein, is provided within the processors 1102 and 1104. At least one example embodiment, however, exists in other circuits, logic units, or devices within the system 1100 of FIG. 11. Furthermore, at least one example embodiment is distributed throughout several circuits, logic units, or devices illustrated in FIG. 11.

Chipset 1120 may be in communication with a bus 1140 via an interface circuit 1141. Bus 1140 may have one or more devices that communicate over it, such as a bus bridge 1142 and I/O devices 1143. Via a bus 1144, bus bridge 1143 may be in communication with other devices such as a keyboard/mouse 1145 (or other input device such as a touch screen, for example), communication devices 1146 (such as modems, network interface devices, or other types of communication devices that may communicate through a computer network), audio I/O device 1147, a data storage device 1148, and/or the like. Data storage device 1148 may store code 1149 that may be executed by processors 1102 and/or 1104. In at least one example embodiment, at least a portion of the bus architectures is implemented with one or more PtP links.

The computer systems depicted in FIGS. 10 and 11 are schematic illustrations of embodiments of computing systems that may be utilized in accordance with various example embodiments. It will be appreciated that various components of the systems depicted in FIGS. 10 and 11 may be combined in a system-on-a-chip (SoC) architecture or in any other suitable configuration. For example, at least one example embodiment disclosed herein can be incorporated into systems such as, for example, mobile devices such as smart cellular telephones, tablet computers, ultrabook computers, personal digital assistants, portable gaming devices, etc. It will be appreciated that these mobile devices may be provided with SoC architectures in at least some embodiments.

Note that in at least one example embodiment, at least one operation, function, etc. outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.), which may be inclusive of non-transitory media. In at least one embodiment, the logic may be computer program instructions, such as code 1004 of FIG. 10. In at least one embodiment, a memory element can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In at least one example embodiment, the processor transforms an element or an article (e.g., data) from one state or thing to another state or thing by way of the instructions. In another example, the activities outlined herein may be implemented with fixed logic or programmable logic (e.g., software/computer instructions executed by a processor) and the elements identified herein could be some type of a programmable processor, programmable digital logic (e.g., FPGA, EPROM, EEPROM) or an ASIC that includes digital logic, software, code, electronic instructions, or any suitable combination thereof.

At least one example embodiment includes software in order to achieve the activities outlined herein. A protection engine (e.g., protection engine 302, 322, 362) and/or an operating system agent (e.g., operating system agent 330, 360), can include memory elements for storing information to be used in achieving the software security activities, as discussed herein. Additionally, the protection engine and/or operating system agent may include a processor that can execute software to perform the activities, as disclosed herein. These devices may further keep information in any suitable memory element (random access memory (RAM), ROM, EPROM, EEPROM, ASIC, etc.), software, hardware, or in any other suitable component, device, element, or object where appropriate and based on particular needs. Additionally or alternatively, the protection engine and/or operating system agent can be configured in software, hardware, firmware or any suitable combination thereof. Any of the memory items discussed herein (e.g., repositories, databases, etc.) should be construed as being encompassed within the broad term 'memory element.' Similarly, any of the potential processing elements, modules, and machines described in this Specification should be construed as being encompassed within the broad term 'processor.'

Note that with the example provided above, as well as numerous other examples provided herein, interaction might be described in terms of two, three, or four elements. However, this has been done for purposes of clarity and example only. In certain cases, it may be easier to describe one or more of the functionalities of a given set of flows by only referencing a limited number of elements. It should be appreciated that the components, modules, and/or the like (and their teachings) are readily scalable and can accommodate a large number of components, as well as more complicated/sophisticated arrangements and configurations. Accordingly, the examples provided should not limit the scope or inhibit the broad teachings of the security module and extraction module as potentially applied to a myriad of other architectures.

It is also important to note that the operations in the preceding flow diagrams illustrate only some of the possible scenarios and patterns that may be executed in association with causing an operation to be performed in relation to a security exception. Some of these operations may be deleted or removed where appropriate, or may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. A security module may provide substantial flexibility in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure.

The following examples pertain to embodiments in accordance with this Specification. One or more embodiments may provide an apparatus, a system, a machine readable storage medium, and/or a method for determining that a module is to be loaded, the module being associated with module code, determining that the module is a frozen module, the frozen module being associated with frozen module code, determining that a module fingerprint of the module fails to correspond with a frozen module fingerprint of the frozen module, and causing loading of the frozen module code instead of the module code.

One or more example embodiments could further include determining that the module fingerprint of the module corresponds with the frozen module fingerprint of the frozen module, and causing loading of the module code instead of the frozen module code.

In at least one example embodiment, determination to load the module is associated with a boot process.

One or more example embodiments further retrieve frozen module information, so that determination that the module is the frozen module is based, at least in part, on the frozen module information.

In at least one embodiment, the frozen module information is retrieved from a repository that is segregated from operating system access.

In at least one example embodiment, the frozen module information comprises at least one of identity information associated with the frozen module, the frozen module fingerprint, the frozen module code, or frozen module code location information.

In at least one example embodiment, the frozen module information comprises frozen module code location information. Such an embodiment may further retrieve the frozen module code, based, at least in part, on the frozen module code location information.

At least one example embodiment further receives a directive regarding change of, at least part of, frozen module information. Such an embodiment may further cause storage of frozen module information indicated by the directive. In at least one example embodiment, the directive comprises frozen module code. Such an embodiment may further cause storage of the frozen module code in a frozen module code repository.

In at least one example embodiment, the directive designates the frozen module code repository.

At least one example embodiment relates to an apparatus that is a computing system, a system on a chip, and/or the like.

Specifics in the examples may be used anywhere in one or more embodiments.

What is claimed is:

1. At least one non-transitory machine-readable storage medium to provide software security including machine-readable instructions, that when executed, cause an apparatus to:
   determine that a module is to be loaded, the module being associated with module code;
   retrieve at least a portion of frozen module information associated with a stored frozen module that includes frozen module code;
   determine that the module is designated as frozen based, at least in part, on a frozen module identity in the frozen module information corresponding to a module identity of the module;
   determine that a module fingerprint of the module fails to correspond to a frozen module fingerprint of the stored frozen module; and
   cause loading of the frozen module code instead of the module code.

2. The medium of claim 1, wherein the determination to load the module is associated with a boot process.

3. The medium of claim 1, wherein the frozen module information is retrieved from a repository that is segregated from operating system access.

4. The medium of claim 1, wherein the frozen module information comprises at least one of the frozen module fingerprint, the frozen module code, or frozen module code location information.

5. The medium of claim 1, wherein the frozen module information comprises frozen module code location information, wherein the medium further includes machine-readable instructions, that when executed, cause the apparatus to retrieve the frozen module code, based, at least in part, on the frozen module code location information.

6. The medium of claim 1, wherein the medium further includes machine-readable instructions, that when executed, cause the apparatus to receive a directive regarding change of, at least part of, the frozen module information.

7. The medium of claim 6, wherein the medium further includes machine-readable instructions, that when executed, cause the apparatus to cause storage of the frozen module information indicated by the directive.

8. The medium of claim 6, wherein the directive comprises the frozen module code, wherein the medium further includes machine-readable instructions, that when executed, cause the apparatus to cause storage of the frozen module code in a frozen module code repository.

9. The medium of claim 8, wherein the directive designates the frozen module code repository.

10. An apparatus for software security, comprising: a processor and a memory, the memory including machine-readable instructions, when executed, cause the processor to:
    determine that a module is to be loaded, the module being associated with module code;
    retrieve at least a portion of frozen module information associated with a stored frozen module that includes frozen module code;
    determine that the module is designated as frozen based, at least in part, on a frozen module identity in the frozen module information corresponding to a module identity of the module;
    determine that a module fingerprint of the module corresponds to a frozen module fingerprint of the stored frozen module; and
    cause loading of the module code instead of the frozen module code.

11. The apparatus of claim 10, wherein the determination to load the module is associated with a boot process.

12. The apparatus of claim 10, wherein the frozen module information is retrieved from a repository that is segregated from operating system access.

13. The apparatus of claim 10, wherein the frozen module information comprises at least one of the frozen module fingerprint, the frozen module code, or frozen module code location information.

14. The apparatus of claim 10, wherein the frozen module information comprises frozen module code location information, wherein the memory further includes machine-readable instructions, that when executed, cause the processor to retrieve the frozen module code, based, at least in part, on the frozen module code location information.

15. The apparatus of claim 10, wherein the memory further includes machine-readable instructions, that when executed, cause the processor to receive a directive regarding change of, at least part of, the frozen module information.

16. The apparatus of claim 15, wherein the memory further includes machine-readable instructions, that when executed, cause the processor to cause storage of the frozen module information indicated by the directive.

17. The apparatus of claim 15, wherein the directive comprises the frozen module code, further comprising causing storage of the frozen module code in a frozen module code repository.

18. The apparatus of claim 17, wherein the directive designates the frozen module code repository.

19. The apparatus of claim 10, wherein the apparatus is a computing system.

20. The apparatus of claim 10, wherein the apparatus is a system on a chip.

21. A method for software security, comprising:
    determining, by an apparatus, that a module is to be loaded, the module being associated with module code;
    retrieving at least a portion of frozen module information associated with a stored frozen module that includes frozen module code;
    determining that the module is designated as frozen based, at least in part, on a frozen module identity in the frozen module information corresponding to a module identity of the module;
    determining that a module fingerprint of the module fails to correspond to a frozen module fingerprint of the stored frozen module; and
    causing loading of the frozen module code instead of the module code.

22. The method of claim 21, wherein the determination to load the module is associated with a boot process.

* * * * *